United States Patent
Isler et al.

(10) Patent No.: US 12,079,275 B2
(45) Date of Patent: *Sep. 3, 2024

(54) CONTEXTUAL INDEXING AND ACCESSING OF VEHICLE CAMERA DATA

(71) Applicant: Forward Thinking Systems, LLC, Jericho, NY (US)

(72) Inventors: David Isler, Plainview, NY (US); Stuart Lowenstein, West Hempstead, NY (US)

(73) Assignee: Forward Thinking Systems, LLC, Jericho, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,621

(22) Filed: Aug. 13, 2020

(65) Prior Publication Data
US 2021/0073278 A1     Mar. 11, 2021

(51) Int. Cl.
| | |
|---|---|
| *G06F 16/787* | (2019.01) |
| *B60R 1/00* | (2022.01) |
| *G06F 16/29* | (2019.01) |
| *G07C 5/00* | (2006.01) |
| *G07C 5/08* | (2006.01) |
| *H04W 4/18* | (2009.01) |
| *H04W 12/104* | (2021.01) |

(52) U.S. Cl.
CPC ............ *G06F 16/787* (2019.01); *G06F 16/29* (2019.01); *H04W 4/185* (2013.01); *H04W 12/104* (2021.01); *B60R 2300/105* (2013.01)

(58) Field of Classification Search
None
See application file for complete search history.

(56) References Cited

U.S. PATENT DOCUMENTS

| | | | |
|---|---|---|---|
| 6,097,429 A | 8/2000 | Seeley et al. | |
| 9,235,750 B1 * | 1/2016 | Sutton | B60R 25/10 |

(Continued)

OTHER PUBLICATIONS

"Electronic Driver Log Solutions to Better Manage Your Fleet," Web Archive—Internet Archive [online], Apr. 7, 2016 [retrieved on Mar. 1, 2018], Retrieved from the Internet: <URL:https://web.archive.org/web/20160407152016/http://www.ftsgps.com:80/electronic-driver-logs.html>, 7 pages.

(Continued)

*Primary Examiner* — Hung Q Dang
(74) *Attorney, Agent, or Firm* — Carr & Ferrell LLP (57) ABSTRACT

Systems and methods for providing access to vehicle videos are provided. An example system may include a plurality of cameras and an electronic device associated with a vehicle. The electronic device can continuously record a plurality of videos captured by the plurality of cameras, periodically generate, based on the plurality of videos, snapshot images including image metadata, and upload the snapshot images to a remote computing system. The remote computing system can render the snapshot images for view and selection by a user and receive, from the user, a selection of a snapshot image of the snapshot images. In response to the user selection, the remote computing system can select, based on the image metadata associated with the selected snapshot image, a video from the plurality of videos and play back a portion of the video stored on the electronic device.

25 Claims, 8 Drawing Sheets

(56) References Cited

U.S. PATENT DOCUMENTS

| | | |
|---|---|---|
| 10,134,285 B1 | 11/2018 | Isler et al. |
| 10,423,886 B2 | 9/2019 | Isler et al. |
| 10,754,893 B1 | 8/2020 | Isler et al. |
| 2002/0005895 A1 | 1/2002 | Freeman et al. |
| 2006/0095175 A1 | 5/2006 | deWaal et al. |
| 2008/0256450 A1 | 10/2008 | Takakura et al. |
| 2010/0250021 A1 | 9/2010 | Cook et al. |
| 2011/0214072 A1* | 9/2011 | Lindemann ............ G01S 19/14 709/219 |
| 2011/0292230 A1* | 12/2011 | Winters ............. G06F 21/6209 348/222.1 |
| 2013/0265450 A1* | 10/2013 | Barnes, Jr. ............ H04N 5/772 348/207.1 |
| 2014/0247352 A1* | 9/2014 | Rathi ................. G06K 9/00798 348/148 |
| 2016/0037140 A1 | 2/2016 | Lindsey et al. |
| 2016/0155004 A1* | 6/2016 | Shiraishi .................. G08G 1/20 348/77 |
| 2016/0332574 A1 | 11/2016 | Park et al. |
| 2017/0017927 A1 | 1/2017 | Domnick et al. |
| 2017/0053555 A1* | 2/2017 | Angel .................. G07C 5/0808 |
| 2017/0200061 A1 | 7/2017 | Julian et al. |
| 2017/0263120 A1 | 9/2017 | Durie, Jr. et al. |
| 2017/0286782 A1 | 10/2017 | Pillai et al. |
| 2017/0289089 A1 | 10/2017 | Liang |
| 2018/0004747 A1 | 1/2018 | Smith et al. |
| 2018/0075309 A1 | 3/2018 | Sathyanarayana et al. |
| 2019/0205781 A1 | 7/2019 | Isler et al. |
| 2019/0385077 A1 | 12/2019 | Isler et al. |
| 2020/0008028 A1 | 1/2020 | Yang |
| 2020/0314117 A1* | 10/2020 | Nguyen ................ G06F 21/552 |

OTHER PUBLICATIONS

Dingus et al., "Human Computer Interaction Applications for Intelligent Transportation Systems", in Handbook of Human-Compuer Interaction Second, Helander et al. (eds), 1997, 24 pages.

* cited by examiner

Visualize, based on the image metadata of the snapshot images, a route of the vehicle
610

Plot, based on the image metadata of snapshot images, the snapshot images along the route, wherein each of the snapshot images is associated with a point of the route corresponding to the geotag of the image metadata
620

```
┌─────────────────────────────────────────────────────┐
│ Store, by the remote computing system, the snapshot │
│                 images to an image catalog          │
│                         710                         │
└─────────────────────────────────────────────────────┘
                            │
                            ▼
┌─────────────────────────────────────────────────────┐
│ Index, by the remote computing system, the snapshot │
│        images based on one or more indices          │
│                         720                         │
└─────────────────────────────────────────────────────┘
```

CONTEXTUAL INDEXING AND ACCESSING OF VEHICLE CAMERA DATA

CROSS-REFERENCE TO RELATED APPLICATIONS

This patent application is a Continuation of, and claims the priority benefit of, U.S. application Ser. No. 16/565,461 filed on Sep. 9, 2019, entitled "Providing Access to Vehicle Videos". The disclosure of the above-referenced application is hereby incorporated by reference in its entirety for all purposes.

FIELD

The present application relates generally to video surveillance of vehicles and, more specifically, to systems and methods for providing access to vehicle videos.

BACKGROUND

Video surveillance is widely used for tracking status and events associated with valuable assets including vehicles, stores, warehouses, houses, and so forth. Video surveillance systems may include cameras installed at the location of an asset. The videos captured by the cameras can be stored in internal memory of a camera. The videos can be uploaded to remote servers in real time. The videos can then be remotely viewed via, for example, web-based applications. Uploading the videos to the remote servers can require a stable and high-speed network connection between the surveillance system installed at the asset location and the remote servers. However, the stable and high-speed network connection may not be always available, specifically when the surveillance system is used in a moving vehicle.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the present disclosure, a system for providing access to vehicle videos is provided. The system may include a plurality of cameras associated with a vehicle. The system may also include an electronic device associated with the vehicle. The electronic device can be configured to continuously record a plurality of videos captured by the plurality of cameras. The electronic device can be configured to periodically generate, based on the plurality of videos, snapshot images including image metadata and upload the snapshot images to a remote computing system. The remote computing system can be communicatively connected to the electronic device. The remote computing system can be configured to render the snapshot images for view and selection by a user. The remote computing system can be configured to receive, from the user, a selection of a snapshot image of the snapshot images. The snapshot image can be selected by clicking on at least one of the snapshot images. In response to the user selection, the remote computing system can be configured to select, based on the image metadata associated with the selected snapshot image, a video from the plurality of videos. The remote computing system can be configured to play back at least a portion of the video stored on the electronic device.

The image metadata can include timestamps and geotags. Rendering the snapshot images can include visualizing, based on the image metadata of the snapshot images, a route of the vehicle and plotting, based on the image metadata of snapshot images, the snapshot images along the route. Each snapshot image can be associated with a point of the route corresponding to the geotag or timestamp in the image metadata.

The snapshot images can be generated, by the electronic device, at a predetermined time interval. For example, the predetermined time interval can be 5 minutes. The plurality of cameras may include an interior facing camera and an exterior facing camera. The electronic device can include a mobile digital video recorder.

The remote computing system can be configured to download the video from the memory of the electronic device in response to the user selection. The remote computing system can be also configured to store the snapshot images to an image catalog and index the snapshot images based on one or more indexes. The indexes can be based on a timestamp, a geolocation, an identifier of the electronic device, and an identity data of an operator of the vehicle.

The electronic device can be configured to determine, based on sensor data of one or more sensors communicatively connected with the electronic device, an occurrence of a triggering event. In response to the triggering event, the electronic device can automatically upload portions of the plurality of videos, wherein the portions are associated with a time of the triggering event.

According to another example embodiment of the present disclosure, a method for providing access to vehicle videos is provided. The method may include continuously recording, by an electronic device associated with a vehicle, a plurality of videos captured by a plurality of cameras associated with a vehicle. The method may also include periodically generating, by the electronic device and based on the plurality of videos, snapshot images including image metadata. The method may also include uploading, by the electronic device, the snapshot images to a remote computing system communicatively connected to the electronic device. The method may further allow rendering, by the remote computing system, the snapshot images for view and selection by a user. The method may further include receiving, by the remote computing system from the user, a user selection of a snapshot image of the snapshot images, wherein the snapshot image is selected by clicking on at least one of the snapshot images. The method may further include, in response to the user selection, selecting, by the remote computing system and based on the image metadata associated with the selected snapshot image, a video from the plurality of videos. The method may further include playing back, by the remote computing system, a portion of the video stored on the electronic device.

The image metadata may include timestamps and geotags. Rendering of the snapshot images may include visualizing a route of the vehicle and plotting the snapshot images based on the image metadata associated with the snapshot images along the route. Each snapshot image can be associated with a point of the route corresponding to the geotag in the image metadata.

The snapshot images can be taken at predetermined time intervals. For example, snapshot images can be taken every 5 minutes. The plurality of cameras can include an interior facing camera and an exterior facing camera. The electronic device can include a mobile digital video recorder.

The method may further include, in response to the user selection, downloading, by the remote computing system, the video from the memory of the electronic device. The method may also include storing, by the remote computing system, the snapshot images to an image catalog. The method may further include indexing, by the remote computing system, the snapshot images based on one or more indexes, wherein the one or more indexes are based on a timestamp, a geolocation, an identifier of the electronic device, and an identity data of an operator of the vehicle.

According to yet another example embodiment of the present disclosure, the steps of the method for providing access to vehicle videos are stored on a non-transitory machine-readable medium comprising instructions, which, when implemented by one or more processors, perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure is directed to example methods and systems for providing access to vehicle videos. Some embodiments of the present disclosure may facilitate cataloguing video files captured by cameras installed on a vehicle. Certain embodiments of the disclosure may allow taking, by an electronic device associated with the vehicle, snapshot images of the video files in periodic increments at a fixed time interval. The snapshot images can be uploaded, by the electronic device, to a remote computing system. The remote computing system can be configured to store the snapshot images to a catalog. The remote computing system may provide a user interface for viewing the snapshot images by a user. The remote computing system may allow the user to select a specific snapshot image corresponding to a specific event (for example, a specific incident). Upon receiving the selection of the specific snapshot image from the user, the remote computing system may play back, from a memory of the electronic device, a portion of the video corresponding to the specific snapshot image.

The snapshot images may be recorded by both interior and exterior facing cameras. The snapshot images may include metadata, which can, in turn, include timestamps and geotags. The remote computing system can index the snapshot images based on the metadata. The snapshot images can be displayed on a map at locations corresponding to the locations of taking the snapshot images. A user can view each snapshot image and play back a video associated with a particular time frame by clicking on a snapshot image displayed at a specific location along the route of the vehicle.

Thus, some embodiments of the present disclosure may allow finding a specific moment in a video associated with the vehicle without scrolling through the entire video. This may eliminate the need for a continuous video upload from the vehicle to a remote computing system. As a result, embodiments of the present disclosure may allow to significantly reduce usage of a cellular network and mobile data between the vehicle and the remote computing system.

The snapshot images can be processed by the remote computing system to perform identification of a driver of the vehicle. The snapshot images can be further indexed based on identity data of drivers to allow the user selecting the snapshot images associated with a specific driver. The snapshot images can be also processed to determine additional features associated with driver's behavior at specific moments. For example, the snapshot images can be analyzed to determine whether the driver is wearing a seat belt, falling asleep, speaking on a mobile phone, smoking a cigarette, and so forth.

While some of the embodiments of the present disclosure are described in reference to operations of vehicles, the technology described herein can be practiced with any other assets including buildings, warehouses, houses, stores, and so forth. Some embodiments of the present disclosure can be used to track performance and behavior of equipment operators at buildings, warehouses, houses, stores, and so forth.

Figure 1:
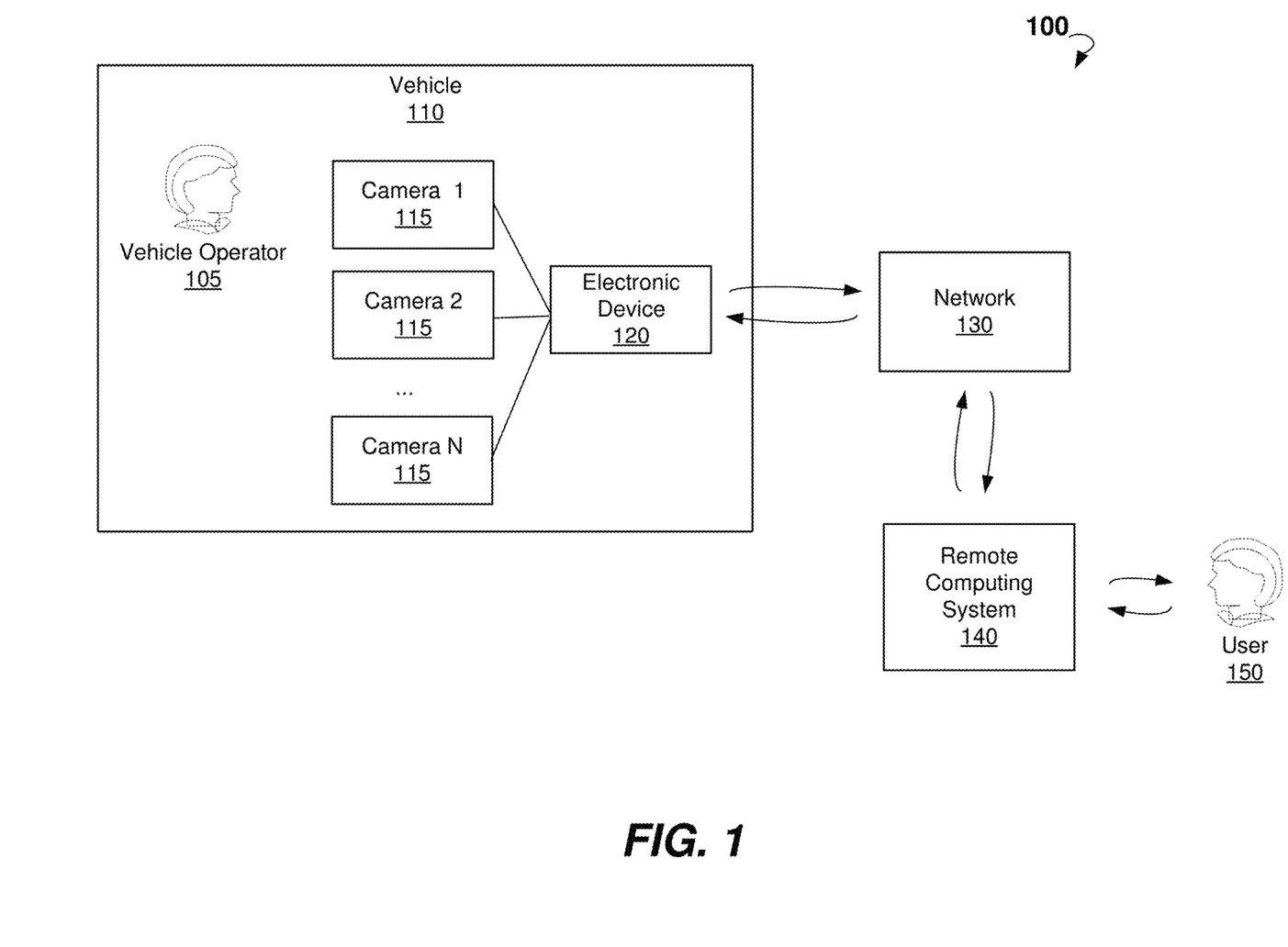
FIG. 1 is a block diagram illustrating a system, wherein methods of providing access to vehicle videos can be practiced, according to some example embodiments.

Referring now to FIG. 1, an example system 100 is shown, wherein methods for providing access to vehicle videos can be practiced, according to some example embodiments. The system 100 may include a vehicle 110, a plurality of cameras 115 associated with the vehicle 110, an electronic device 120 associated with the vehicle 110, a network 130, and a remote computing system 140. The vehicle 110 can be operated by a vehicle operator 105 (also referred as a driver). The remote computing system 140 may be used by a user 150.

The plurality of cameras 115 may include one or more interior facing camera and one or more exterior facing camera. One of the cameras 115 can substantially face the vehicle operator's seat. One of the cameras 115 can face front to a road of the vehicle 110. The cameras 115 may be mounted on the interior or exterior of the vehicle 110 (for example, on the windshield). Cameras may include a focusing lens coupled with a Charge Coupled Device (CCD) or a focusing lens coupled with a Complementary Metal Oxide Semiconductor (CMOS) image sensor. The camera may include additional optical elements, such as lenses, filters, and optical image stabilizers, which function to enhance images or correct for optical aberrations. Digital enhancement of images may also be provided through firmware or software within the cameras 115 or the electronic device 120.

The electronic device 120 may be configured to record a plurality of videos captured by the plurality of cameras 115. The electronic device 120 may be connected to the cameras 115 using wired connections or wireless connections. In some embodiments, the electronic device 120 may include a mobile digital video recorder. The electronic device 120 may continuously record the videos from cameras 115 in a loop. The time length of the loop may depend on a memory storage of the electronic device 120. The electronic device 120 may periodically generate snapshot images of the videos and upload, via the network 130, the snapshot images to the remote computing system 140 for further processing. The electronic device 120 is described in detail in FIG. 2.

The network 130 may include any wireless network, for example, the cellular phone networks, for example, Global System for Mobile (GSM) communications networks, Wi-Fi networks, Internet Protocol (IP) communications network, or any other data communication networks and combination of thereof.

The remote computing system 140 may include a personal computer (PC), a standalone server, a cloud-based computing resource, and so forth. In some embodiments, the user 150 can use the remote computing system 140 via user input devices and a graphical display system of the remote computing system 140.

In other embodiments, wherein the remote computing system 140 is a server or a cloud-based computing resource, the user 150 may use a personal computing device to access to the remote computing system 140. The personal computing device may include a smartphone, a tablet computer, and a desktop computer. The personal computing device may be connected to the remote computing system 140 via a data network (for example, the Internet). The remote computing system 140 may provide one or more web-based applications to be used by the user 150 via the personal computing device. The remote computing system 140 can be configured to catalog the snapshot images received from the electronic device 120. The remote computing system 140 can be also configured to provide a user interface for viewing and selecting the snapshot images. The remote computing system 140 can be also configured to play back, per user request, a portion of one of the plurality videos stored in a memory of the electronic device 120.

Figure 2:
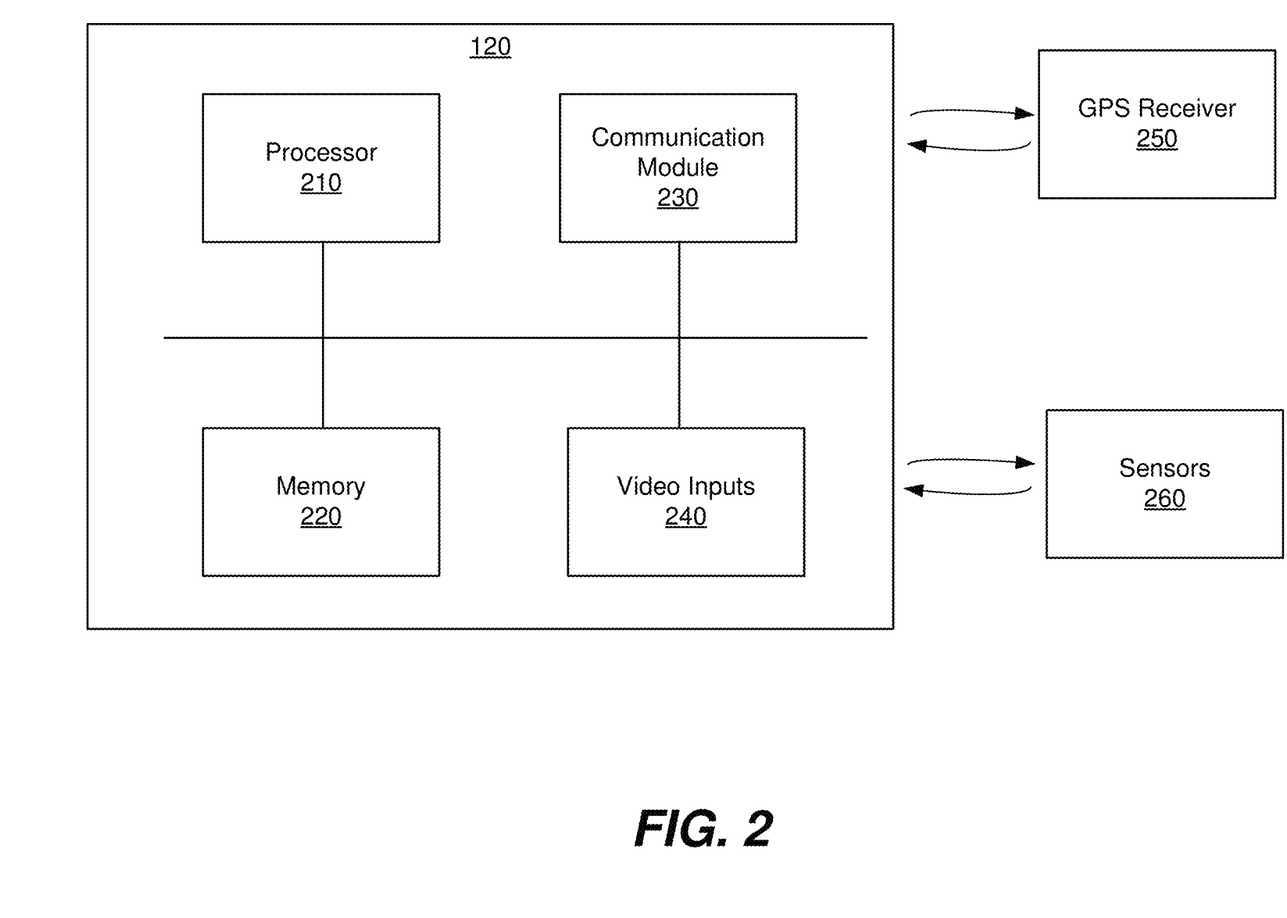
FIG. 2 is a block diagram illustrating an example electronic device, wherein methods of providing access to vehicle videos can be practiced, according to some example embodiments.

FIG. 2 is a block diagram illustrating an example electronic device 120, wherein methods for providing access to vehicle videos can be practiced, according to some example embodiments. In the illustrated embodiment, the electronic device 120 includes a processor 210, a memory 220, a communication module 230, and video inputs 240. In other embodiments, the electronic device 120 includes additional or other components necessary for operations of electronic device 120. Similarly, the electronic device 120 can include fewer components that perform functions similar or equivalent to those depicted in FIG. 2.

The processor 210 may include hardware and/or software, which is operable to execute computer programs stored in memory 220. The processor 210 uses floating point operations, complex operations, and other operations, including processing videos received from a plurality of cameras via video inputs 240. In some embodiments, the processor 210 includes at least one of a general-purpose processor and an image processor. The processor 210 can be configured to continuously record the videos to the memory 220. Periodically, at a predetermined interval, the processor 210 may generate snapshot images of the videos and send the snapshot videos, via the communication module 230, to the remote computing system 140 (shown in FIG. 1). The processor 210 may be configured to add metadata to the snapshot images. The metadata may include timestamps and geotags. The metadata may also include an identifier of the vehicle, an identifier of the electronic device, and an identifier of a camera.

The communication module 230 may include a GSM module and a Wi-Fi module. The communication module 230 may configured to communicate with the network 130 (shown in FIG. 1) to send a data stream including snapshot images and portions of videos.

A Global Positioning System (GPS) receiver 250 can be housed within the vehicle 110. In some embodiments, the GPS receiver 250 can be housed within the electronic device 120. In other embodiments, the GPS receiver 250 can be a separate unit communicatively connected with the electronic device 120. GPS receiver 250 can determine locations of the vehicle based on signals received from GPS satellites orbiting the Earth. The locations can be used by the processor 210 of the electronic device 120 for generating geotags of the snapshot images.

Sensors 260 may include g-force sensors, accelerometers, gyroscopes, inertia measurement units, proximity sensors, and so forth. The sensors 260 can be housed within the vehicle 110. In some embodiments, the sensors 260 can be housed within the electronic device 120. In other embodiments, the sensors 260 can be separate units communicatively connected with the electronic device 120. The processor 210 of the electronic device 120 may be configured to read data from the sensor and detect a triggering event. The triggering event may include an atypical vehicle movement including harsh braking, harsh acceleration, harsh cornering, lane departure, and driving too close to a vehicle in front. In these cases, upon detection of the triggering event, the processor 210 can be configured to automatically send an alert to the remote computing system 140. The processor 210 can be also configured to automatically upload a portion of one of the videos to the remote computing system, wherein the portion may correspond to a time frame preceding the event.

Figure 3:
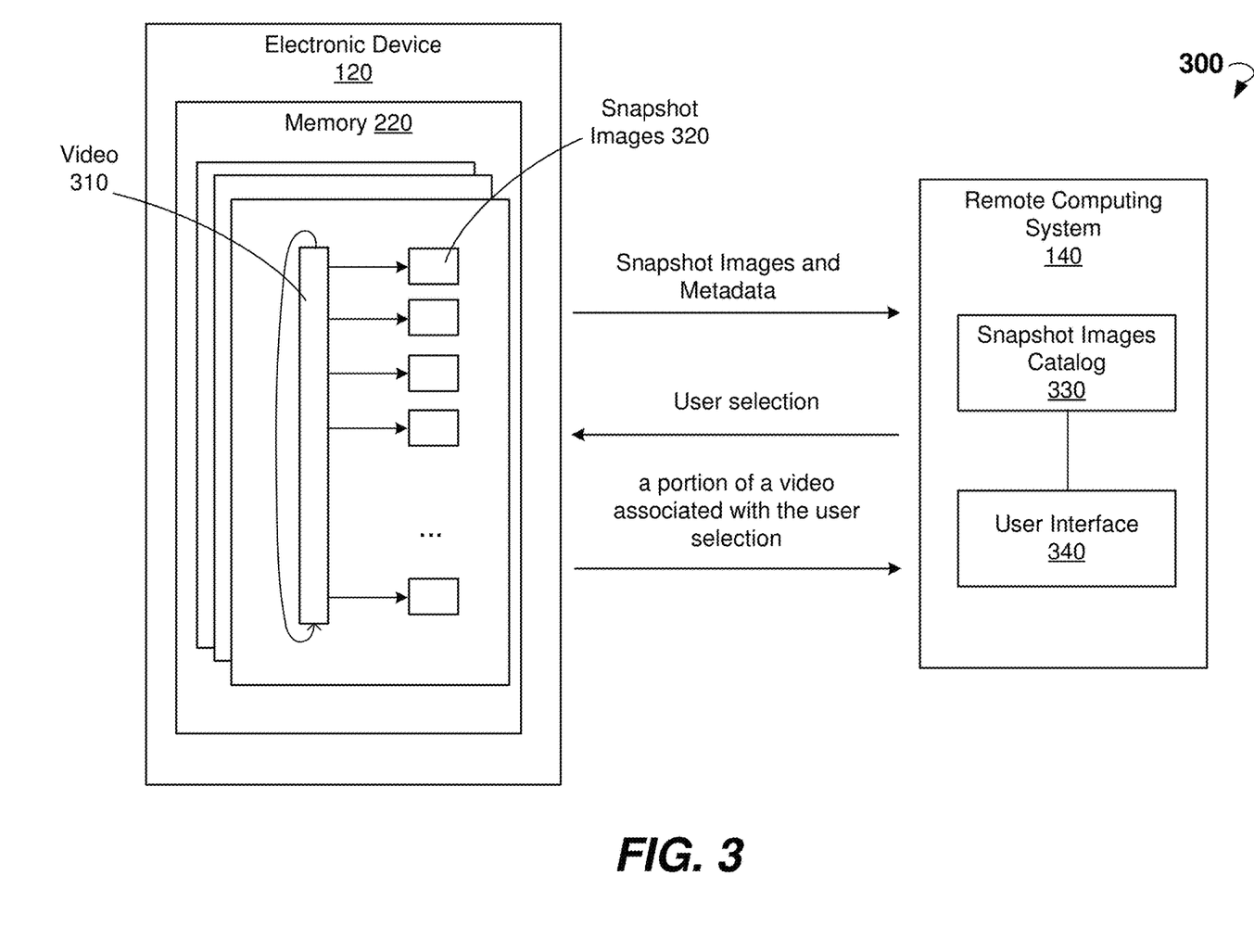
FIG. 3 is a block diagram illustrating an example electronic device and a remote computing system, according to some example embodiments.

FIG. 3 is a block diagram 300 illustrating an example electronic device 120 and a remote computing system 140, according to some example embodiments. The electronic device 120 may continuously record one or more videos 310 captured by the plurality of cameras 115 (shown in FIG. 1). The electronic device 120 may store the videos 310 in memory 220. Periodically, at predetermined time intervals the electronic device 120 may generate snapshot images 320 of the videos 310. The electronic device 120 may add metadata to the snapshot images 320. The metadata may include timestamps, geotags, an identifier of the camera, an identifier of the electronic device, and an identifier of the vehicle. In some embodiments, the metadata may include speed and direction of vehicle. The electronic device 120 may be configured to receive the speed and direction from the sensor 260 (shown in FIG. 2) or a vehicle's computer. Each of the generated snapshot images can be further sent to the remote computing system 140.

The remote computing system 140 may include a snapshot images catalog 330 for storing the snapshot images received from the electronic device 120 and other electronic devices associated with other vehicles. The snapshot images can be indexed to facilitate filtering the snapshot images and searching for a desired snapshot image. The snapshot images can be indexed by timestamps, geotags, identifiers of the camera, identifiers of the electronic devices, and identifiers of the vehicle.

The snapshot images can be also processed to identify a driver in snapshot images by methods of facial recognition. Accordingly, the snapshot images can be indexed by identity data of drivers (for example, names of drivers). This may allow filtering the snapshot images associated with a specific driver.

Right after being received from the electronic device 120, each of the snapshot images can be analyzed to determine an occurrence of a triggering event. The triggering event may include a driver not wearing a seatbelt, the driver falling asleep, the driver distracted, the driver smoking a cigarette, and the driver using a cell phone. In these situations, the remote computing system 140 may issue an alert or send alert messages to the user 150. The remote computing system 140 may also automatically download a portion of video corresponding to a time frame of the triggering event.

In some embodiments, the seatbelt in the vehicle may include a sticker. The sticker can be captured by a camera facing the driver's seat in the car. The remote computing system 140 can be configured to determine whether the driver is wearing the seatbelt by determining whether the sticker is present in the snapshot image.

The remote computing system 140 may be configured to provide a user interface 340 for displaying the snapshot images for viewing and selecting by a user. The user may review the snapshot images to find a specific snapshot image corresponding to a specific time, a specific location of the vehicle, a specific driver, and a specific event associated with car accident or driver's behavior. The user may select a specific snapshot image by clicking or tapping on it. Upon receiving the user selection, the remote computing system 140 may play back, from the memory 220 of the electronic device 120, a desired portion of video associated with the selected snapshot image. For example, the remote computing system 140 may determine, based on metadata, an identifier of the camera with which the snapshot image was taken and a timestamp of the snapshot image. The remote computing system 140 may send the identifier of the camera and the timestamp to the electronic device 120 and receive an address in the memory 220 at which the portion of the video starts. The remote computing system 140 can further read the portion of the video from the memory 220.

Per user request, the desired portion of video can be downloaded to the remote computing system 140. The download of the desired portion of video can be performed when a network connection bandwidth between the electronic device 120 and the remote computing system 140 becomes higher than a predetermined threshold.

Figure 4:
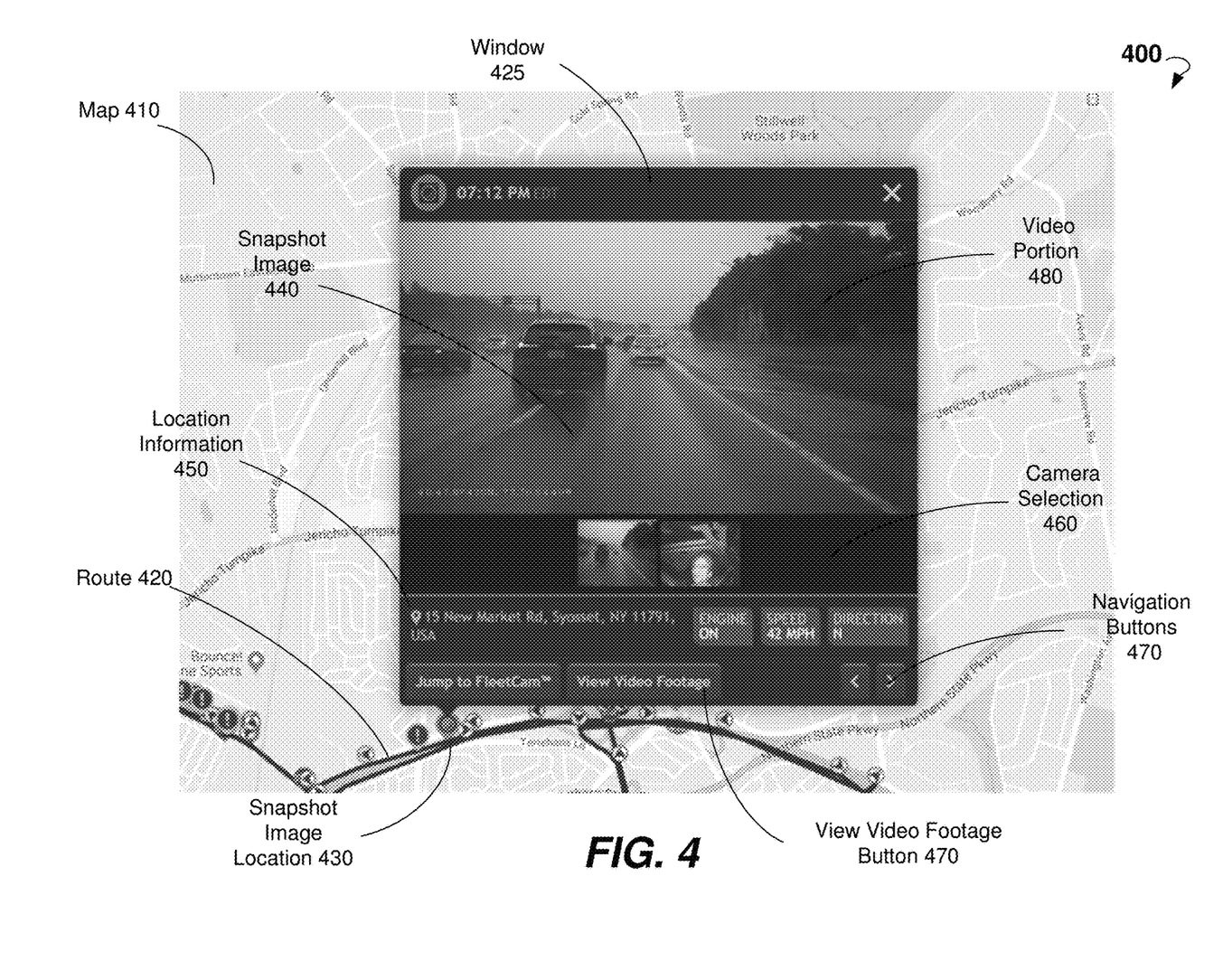
FIG. 4 is an example screen of a user interface provided by a remote computing system, according to some example embodiments.

FIG. 4 is an example screen 400 of a user interface provided by the remote computing system 140, according to some example embodiments. The screen 400 includes a map 410 and a route 420 of a vehicle. Using geotags and timestamps in metadata, the snapshot images received from the vehicle can be associated with locations along the route 420. A user may click on a location 430 on the route 420. In response to the click, the user interface may display a window 425.

The window 425 may include a snapshot image 440 corresponding to the location 430, location information 450 (street, city, and state), and information on speed and direction of the vehicle at the time when the snapshot image was generated. The window 425 may further include camera selection area 460 showing small tiles of all snapshot images associated with the location 430. The snapshot images are generated based on video captured by cameras associated with the vehicle. The user may click on one of the tiles to select a snapshot from a specific camera (for example, interior facing camera or exterior facing camera). The user may use the navigation buttons 470 to move to a previous snapshot image on the route 420 or next snapshot image on the route 420. The user may use the view video footage button 475. In response, the user interface may play back a portion of video (e.g., video portion 480) corresponding to the currently viewed snapshot image 440. As mentioned above, the portion of video (e.g., video portion 480) can be read from a memory of the electronic device 120 located in the vehicle.

Figure 5:
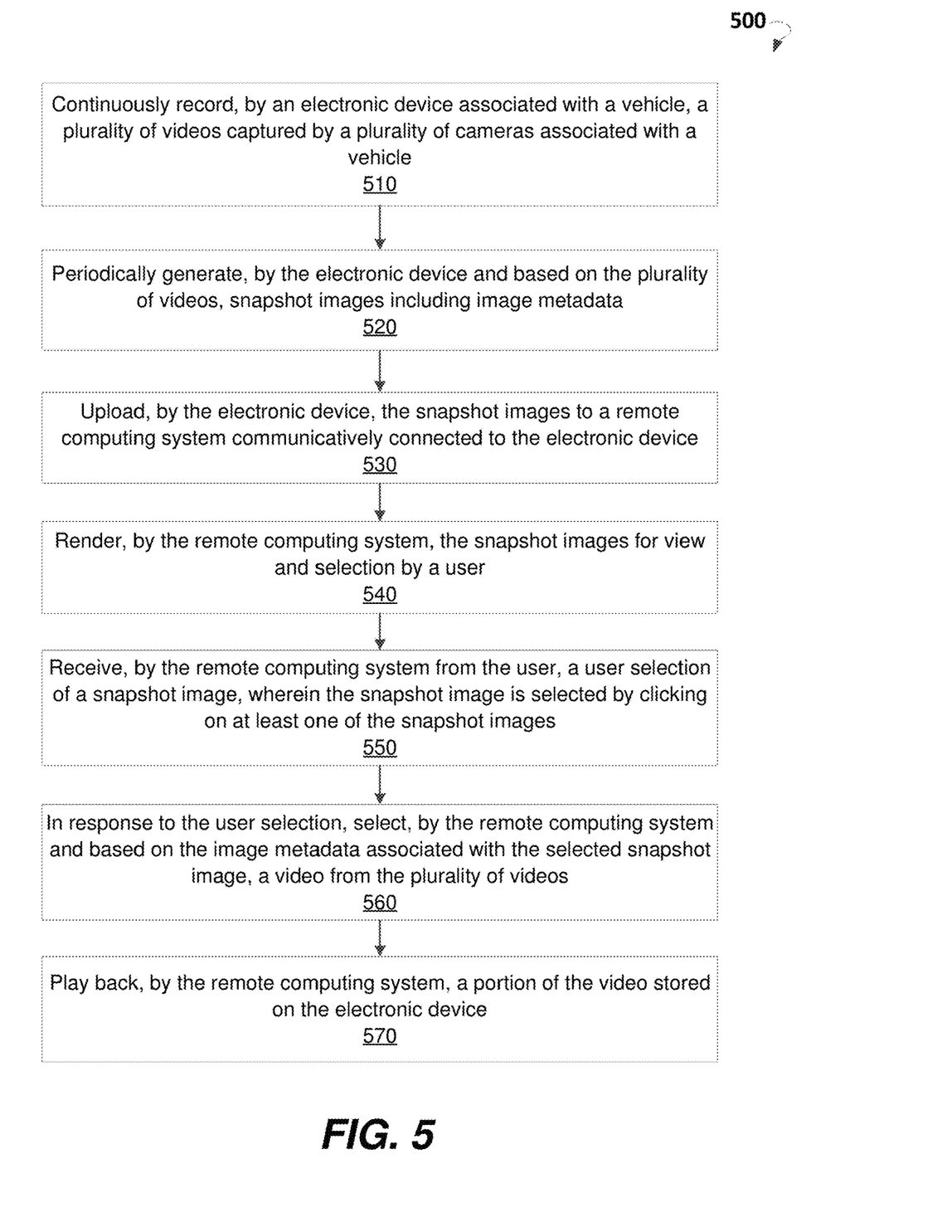
FIG. 5 is a flow chart showing steps of a method for providing access to vehicle videos, according to some example embodiments.

FIG. 5 is a flow chart showing steps of a method 500 for providing access to vehicle videos, according to some example embodiments. The method 500 may be implemented using the system 100 shown in FIG. 1.

In block 510, the method 500 may commence with continuously recording, by an electronic device associated with a vehicle, a plurality of videos captured by a plurality of cameras associated with a vehicle.

In block 520, the method 500 may include periodically generating, by the electronic device and based on the plurality of videos, snapshot images including image metadata. The snapshot images may include image metadata. The image metadata may include timestamps and geotags. The snapshot images can be taken at a predetermined time interval. The predetermined time interval can be 5 minutes. The plurality of cameras may include an interior facing camera and an exterior facing camera. The electronic device may include a mobile digital video recorder.

In block 530, the method 500 may include uploading, by the electronic device, the snapshot images to a remote computing system communicatively connected to the electronic device.

In block 540, the method 500 may include rendering, by the remote computing system, the snapshot images for viewing and selecting by a user.

In block 550, the method 500 may include receiving, by the remote computing system from the user, a user selection of a snapshot image from the snapshot images. The snapshot image can be selected by clicking on at least one of the snapshot images.

In block 560, in response to the user selection, the method 500 may include selecting, by the remote computing system and based on the image metadata associated with the selected snapshot image, a video from the plurality of videos.

In block 570, the method may include playing back, by the remote computing system, a portion of the video stored on the electronic device.

Figure 6:
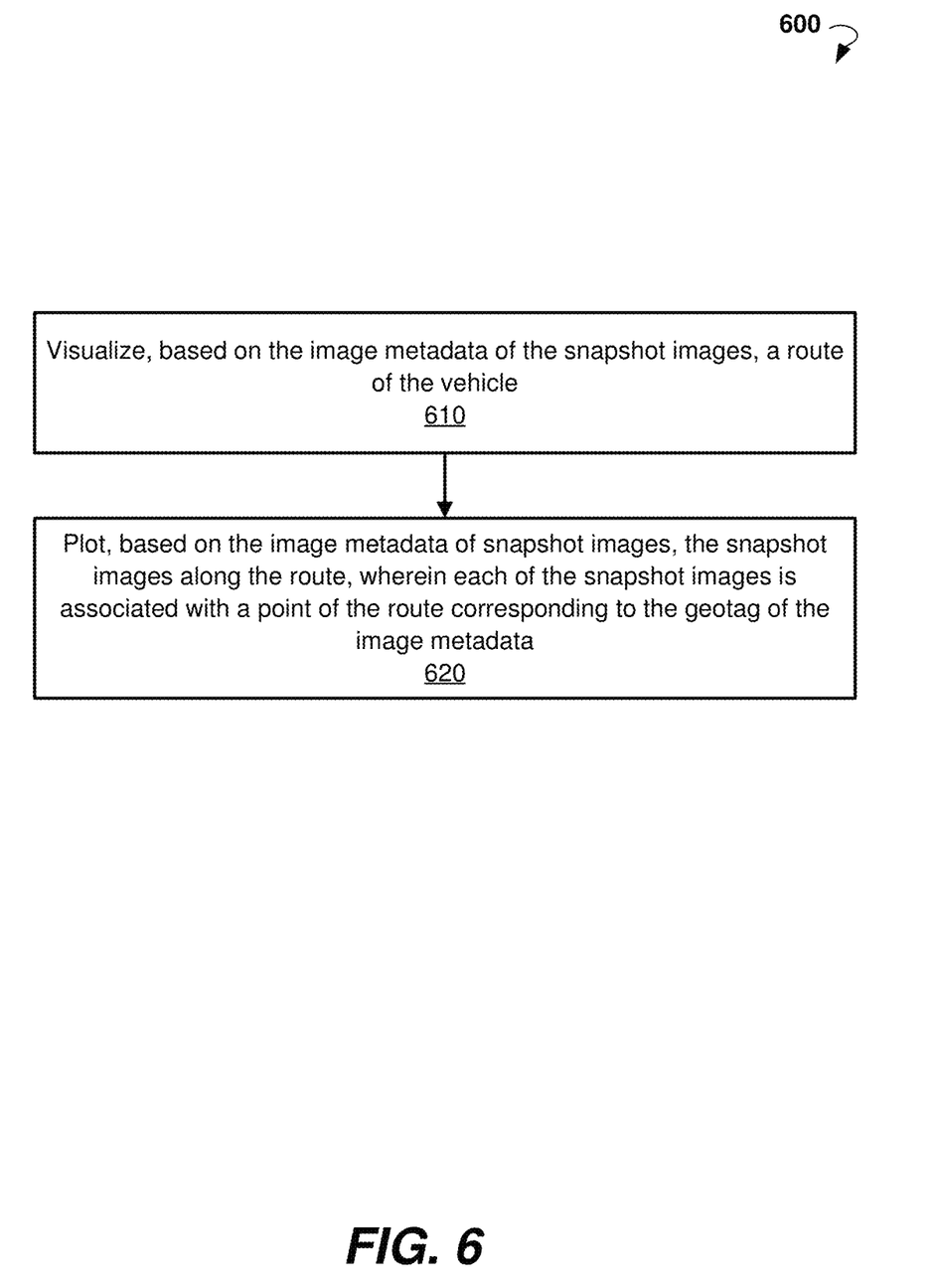
FIG. 6 is a flow chart showing steps of a method for displaying snapshot images of vehicle videos, according to an example embodiment.

FIG. 6 is a flow chart showing steps of a method 600 for displaying snapshot images of vehicle videos, according to an example embodiment. The method 600 may provide details for block 540 of the method 500 shown in FIG. 5.

In bock 610, the method 600 may include visualizing, based on the image metadata of the snapshot images, a route of the vehicle.

In block 620, the method 600 may include plotting, based on the image metadata of snapshot images, the snapshot images along the route. Each of the snapshot images can be associated with a point of the route corresponding to the geotag in the image metadata.

Figure 7:
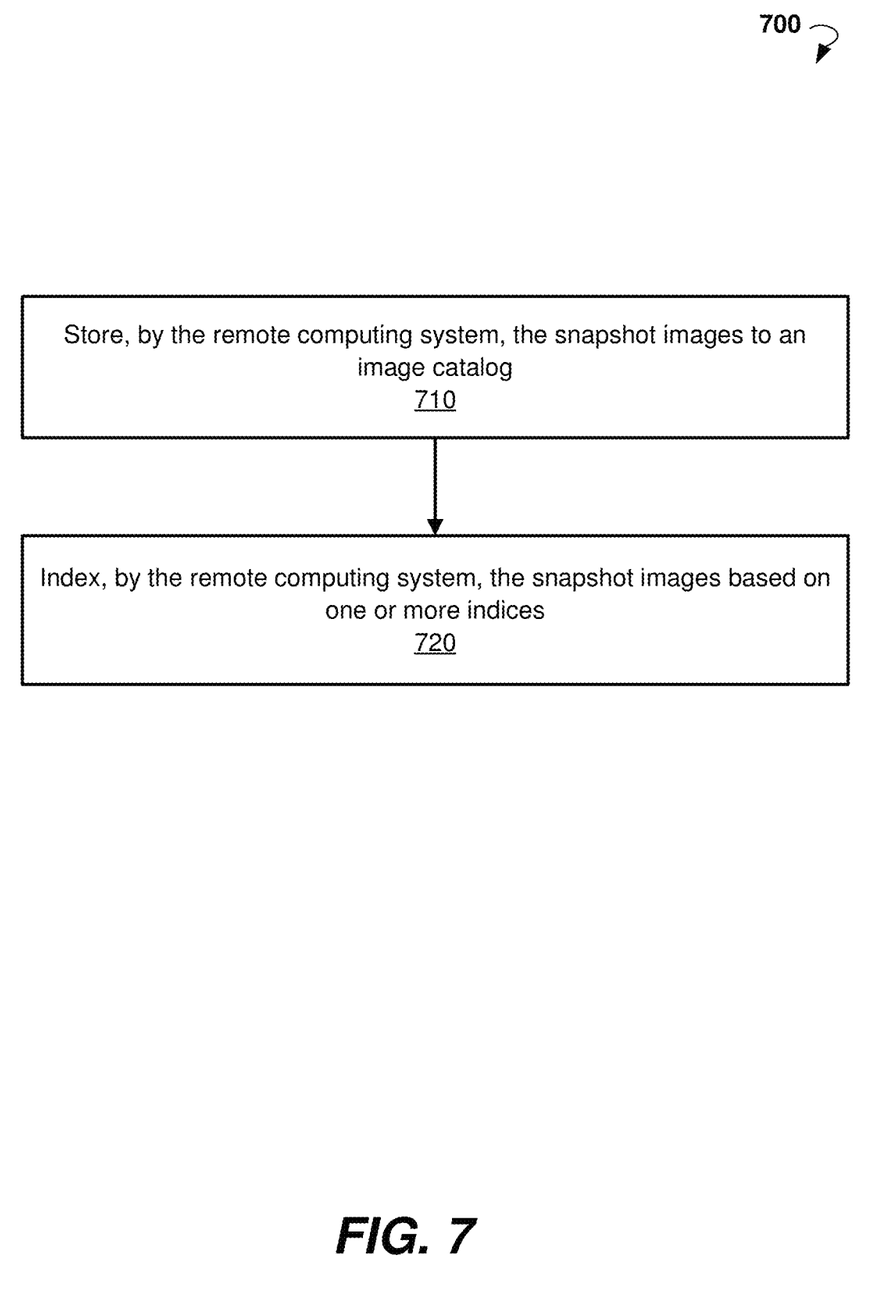
FIG. 7 is a flow chart showing steps of a method for processing snapshot images of vehicle videos, according to various example embodiments.

FIG. 7 is a flow chart showing steps of a method 700 for processing snapshot images of vehicle videos, according to various example embodiments. The method 700 can be performed after the block 530 of the method 500 shown in FIG. 5.

In block 710, the method 700 may include storing, by the remote computing system, the snapshot images to an image catalog.

In block 720, the method 700 may include indexing, by the remote computing system, the snapshot images based on one or more indexes. The indexes can be based on a timestamp, a geolocation, an identifier of the electronic device, and an identity data of an operator of the vehicle.

Figure 8:
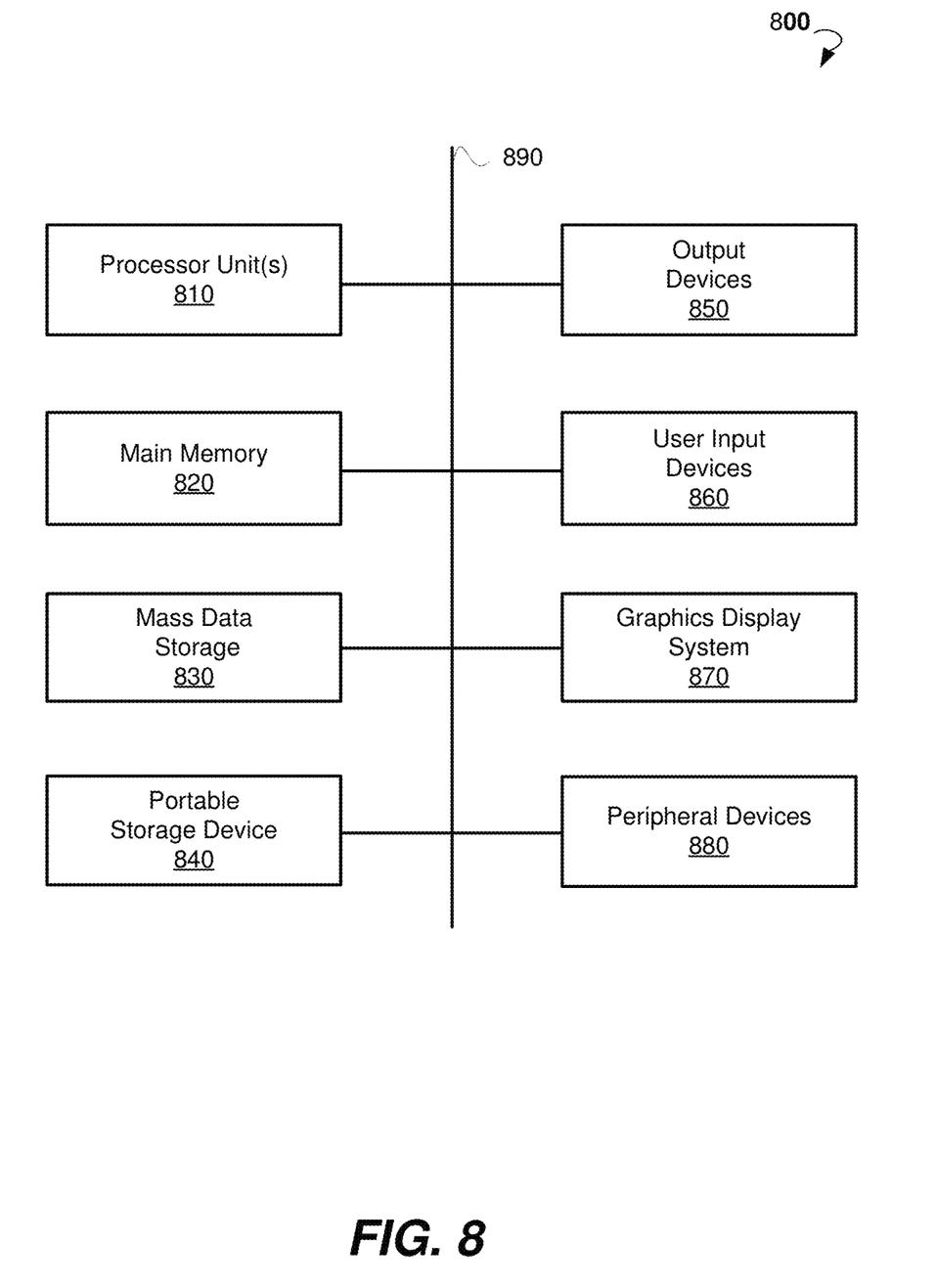
FIG. 8 is an example computer system that may be used to implement embodiments of the disclosed technology.

FIG. 8 illustrates an exemplary computer system 800 that may be used to implement some embodiments of the present invention. The computer system 800 of FIG. 8 may be implemented in the contexts of the likes of computing systems, networks, servers, or combinations thereof. The computer system 800 of FIG. 8 includes one or more processor units 810 and main memory 820. Main memory 820 stores, in part, instructions and data for execution by processor units 810. Main memory 820 stores the executable code when in operation, in this example. The computer system 800 of FIG. 8 further includes a mass data storage 830, portable storage device 840, output devices 850, user input devices 860, a graphics display system 870, and peripheral devices 880.

The components shown in FIG. 8 are depicted as being connected via a single bus 890. The components may be connected through one or more data transport means. Processor unit 810 and main memory 820 is connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 of FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 includes a liquid crystal display (LCD) or other suitable display device. Graphics display system 870 is configurable to receive textual and graphical information and processes the information for output to the display device.

Peripheral devices 880 may include any type of computer support device to add additional functionality to the computer system.

The components provided in the computer system 800 of FIG. 8 are those typically found in computer systems that may be suitable for use with embodiments of the present disclosure and are intended to represent a broad category of such computer components that are well known in the art. Thus, the computer system 800 of FIG. 8 can be a PC, handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 800 is implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A system for providing access to vehicle videos, the system comprising:
 a plurality of cameras associated with a vehicle; and
 an electronic device associated with the vehicle, the electronic device being configured to:
  continuously record a plurality of videos captured by the plurality of cameras; and
 periodically:
  generate, based on the plurality of videos, snapshot images including image context; and
  upload the snapshot images to a remote computing system including a virtual machine operating within a computing cloud and communicatively connected to the electronic device, wherein:
   the remote computing system is configured to:

analyze whether a driver is wearing a seat belt, speaking on a mobile phone and smoking a cigarette;
render the snapshot images for viewing and selecting by a user;
store the snapshot images to an image catalog;
index the snapshot images based on indexes, the indexes being based on a timestamp, a geolocation, an identifier of the electronic device, and an identifier of the driver;
receive, from the user, a user selection of a snapshot image of the snapshot images, wherein the snapshot image is selected by clicking on at least one of the snapshot images without having to scroll through an entire video, eliminating a need for a continuous video upload from the vehicle to the remote computing system, significantly reducing usage of a cellular network and mobile data between the vehicle and the remote computing system; and
in response to the user selection:
select, based on the image context associated with the selected snapshot image, a video from the plurality of videos; and
play back a portion of the video stored on the electronic device.

2. The system of claim 1, wherein the image context include timestamps and geotags.

3. The system of claim 2, wherein the rendering the snapshot images includes:
visualizing, based on the image context of the snapshot images, a route of the vehicle; and
plotting, based on the image context of the snapshot images, the snapshot images along the route, wherein each of the snapshot images is associated with a point of the route corresponding to the geotags in image metadata.

4. The system of claim 1, wherein the snapshot images are taken at a predetermined time interval.

5. The system of claim 4, wherein the predetermined time interval is 5 minutes.

6. The system of claim 1, wherein the plurality of cameras comprises at least one camera facing towards an interior of the vehicle and at least one camera facing towards an exterior of the vehicle.

7. The system of claim 1, wherein the plurality of cameras comprises a plurality of cameras facing towards an exterior of the vehicle.

8. The system of claim 1, wherein the electronic device includes a mobile digital video recorder.

9. The system of claim 1, wherein the remote computing system is configured to, in response to the user selection, download the video from a memory of the electronic device.

10. The system of claim 1, wherein the electronic device is configured to:
determine, based on sensor data of one or more sensors communicatively connected with the electronic device, an occurrence of a triggering event; and
in response to the triggering event, automatically upload portions of the plurality of videos, the portions being associated with a time of the triggering event.

11. The system of claim 1, further comprising, processing, by the remote computing system, the snapshot images using methods of facial recognition.

12. A method for providing access to vehicle videos, the method comprising:
continuously recording, by an electronic device associated with a vehicle, a plurality of videos captured by a plurality of cameras associated with the vehicle;
periodically:
generating, by the electronic device and based on the plurality of videos, snapshot images including image context;
uploading, by the electronic device, the snapshot images to a remote computing system including a virtual machine operating within a computing cloud and communicatively connected to the electronic device;
analyzing whether a driver is wearing a seat belt, speaking on a mobile phone and smoking a cigarette;
storing, by the remote computing system, the snapshot images to an image catalog;
indexing, by the remote computing system, the snapshot images based on indexes, wherein the indexes are based on a timestamp, a geolocation, an identifier of the electronic device, and an identifier of the driver;
rendering, by the remote computing system, the snapshot images for viewing and selecting by a user;
receiving, by the remote computing system from the user, a user selection of a snapshot image of the snapshot images, wherein the snapshot image is selected by clicking on at least one of the snapshot images without having to scroll through an entire video, eliminating a need for a continuous video upload from the vehicle to the remote computing system, significantly reducing usage of a cellular network and mobile data between the vehicle and the remote computing system; and
in response to the user selection:
selecting, by the remote computing system and based on the image context associated with the selected snapshot image, a video from the plurality of videos; and
playing back, by the remote computing system, a portion of the video stored on the electronic device.

13. The method of claim 12, wherein:
the image context include timestamps and geotags; and
the rendering the snapshot images includes:
visualizing, based on the image context of the snapshot images, a route of the vehicle; and
plotting, based on the image context of the snapshot images, the snapshot images along the route, wherein each of the snapshot images is associated with a point of the route corresponding to the geotags in the image context.

14. The method of claim 12, wherein the snapshot images are taken at a predetermined time interval.

15. The method of claim 14, wherein the predetermined time interval is 5 minutes.

16. The method of claim 12, wherein the plurality of cameras comprises at least one camera facing towards an interior of the vehicle and at least one camera facing towards an exterior of the vehicle.

17. The method of claim 12, wherein the plurality of cameras comprises a plurality of cameras facing towards an exterior of the vehicle.

18. The method of claim 12, wherein the electronic device includes a mobile digital video recorder.

19. The method of claim 12, further comprising in response to the user selection, downloading, by the remote computing system, the video from a memory of the electronic device.

20. A non-transitory computer-readable storage medium having embodied thereon instructions, which when executed by at least one processor, perform steps of a method, the method comprising:
continuously recording, by an electronic device associated with a vehicle, a plurality of videos captured by a plurality of cameras associated with the vehicle; periodically:
generating, by the electronic device and based on the plurality of videos, snapshot images including image context; and
uploading, by the electronic device, the snapshot images to a remote computing system including a virtual machine operating within a computing cloud and communicatively connected to the electronic device, wherein the remote computing system is configured to:
analyze whether a driver is wearing a seat belt, speaking on a mobile phone and smoking a cigarette;
store the snapshot images to an image catalog;
index the snapshot images based on indexes, wherein the indexes are based on a timestamp, a geolocation, an identifier of the electronic device, and an identifier of the driver;
render the snapshot images for viewing and selecting by a user;
receive, from the user, a user selection of a snapshot image of the snapshot images, wherein the snapshot image is selected by clicking on at least one of the snapshot images without having to scroll through an entire video, eliminating a need for a continuous video upload from the vehicle to the remote computing system, significantly reducing usage of a cellular network and mobile data between the vehicle and the remote computing system; and
in response to the user selection:
select, based on the image context associated with the selected snapshot image, a video from the plurality of videos; and
play back a portion of the video stored on the electronic device.

21. The method of claim 20, further comprising accessing the snapshot images by clicking at a specific location on a map.

22. The method of claim 20, further comprising sorting the snapshot images by the driver.

23. The method of claim 20, further comprising sorting the snapshot images by driver activity.

24. The method of claim 20, further comprising triggering a retrieval of the snapshot images by an atypical driver behavior or action.

25. The method of claim 20, further comprising automatically downloading at least one of the snapshot images or at least one of the plurality of videos based on atypical driver behavior or action.

* * * * *